United States Patent [19]

Curtis et al.

[11] Patent Number: 4,772,980
[45] Date of Patent: Sep. 20, 1988

[54] IMMERSION COOLING SAFETY MONITORING SYSTEM

[75] Inventors: Ronald L. Curtis; James S. Mandelert; Christopher T. Nesja, all of Chippewa Falls, Wis.

[73] Assignee: Cray Research, Inc., Minneapolis, Minn.

[21] Appl. No.: 935,338

[22] Filed: Nov. 26, 1986

[51] Int. Cl.$^4$ .......................... H02H 3/20; H02H 3/24
[52] U.S. Cl. ........................................ 361/90; 361/385
[58] Field of Search ...................... 361/56, 88, 90, 91, 361/92, 385; 340/660, 662, 663; 62/259.2; 357/83

[56] References Cited

U.S. PATENT DOCUMENTS

| | | | |
|---|---|---|---|
| 4,318,152 | 3/1982 | Weber | 361/92 |
| 4,428,020 | 1/1984 | Blanchard, Jr. | 361/90 |
| 4,541,029 | 9/1925 | Ohyama | 361/90 X |
| 4,590,538 | 5/1986 | Cray, Jr. | 361/385 |

*Primary Examiner*—A. D. Pellinen
*Assistant Examiner*—Derek S. Jennings
*Attorney, Agent, or Firm*—Merchant, Gould, Smith, Edell, Welter & Schmidt

[57] ABSTRACT

A safety monitoring system for an immersion cooling system of a large, high-density electronic assembly such as a supercomputer protects against the possibility of toxic gas formation due to overheating and breakdown of the cooling liquid caused by a system failure. Voltage taps are provided on all of the power supply bars in the computer, and are brought out to the monitoring system, which scans them and compares them against predetermined voltage tolerance limits. A catastrophic electronic failure or short circuit within the computer could produce arcing that could cause local high temperatures and coolant breakdown. The reduction in voltage caused by such failure would immediately be detected by the monitor, which would operate to shut down power to the computer, and activate a safety ventilation system prior to any substantial production of toxic gas.

9 Claims, 3 Drawing Sheets

IMMERSION COOLING SAFETY MONITORING SYSTEM

FIELD OF THE INVENTION

This invention pertains generally to the field of liquid immersion cooling systems for large, high-density electronic assemblies such as computers. Specifically, the invention pertains to a safety monitoring system for immersion cooling systems to guard against the possibility of toxic gas formation due to overheating of the cooling liquid because of a system failure.

BACKGROUND OF THE INVENTION

Liquid immersion and circulation cooling systems of the type disclosed in U.S. Pat. No. 4,590,538 by Seymour R. Cray, and assigned to Cray Research, Inc., have been successfully applied to the design of supercomputers. In such systems, the logic and memory circuits are assembled in high-density modules arranged in a plurality of vertical stacks positioned closely adjacent one another in a tank or container filled with inert cooling liquid. The adjacent stacks of circuit modules are spaced apart to form coolant flow columns therebetween, and alternate ones of the coolant flow columns are used for supplying coolant into the container and alternate ones are used for removing coolant from the container in such a fashion that coolant flow is established across and between the circuit modules in the stacks. The removed coolant and some vapor bubbles formed therein through heating are processed through a heat exchanger external to the container holding the computer and reintroduced. A reservoir is also connected to the container for holding the coolant during pump-down to service the computer. This technique has proven effective for successfully cooling a four-processor supercomputer having 256 million words of random access memory, all fitting within a container of approximately 28 cubic feet and dissipating approximately 160,000 watts of power.

The inert liquid used is a fluorocarbon product called Fluorinert, made by the 3M Company. The circulation rate of the inert liquid through the computer is chosen in consideration of the heat load produced by the computer and the characteristics of the liquid. It is normal that some vapor bubbles will be formed and rise to the top, where they are carried down with the outlet flow of the coolant to eventually recondense. However, substantial boiling is to be avoided, as excessive production of vapor bubbles greatly decreases cooling efficiency.

Generally, in such immersion-cooled supercomputers, the total power consumption and heat dissipation are so great that the temperature within the computer could get rapidly out of control if the circulation system were impaired, for example, by a failure of a pump or heat exchanger. For that reason, monitoring systems have been used which monitor components of the cooling system and which include coolant temperature and flow sensors. Therefore, if there is a temperature rise due to a system failure, it will be quickly detected and the computer can be shut down to prevent damage. This is especially important not only to protect the computer hardware from temperature-induced damage, but also because it is recognized that the fluorocarbon inert liquid coolants can break down into toxic gases at high temperatures above approximately 200° C., and these toxic gases could pose a hazard to personnel in the area.

The breakdown temperature is so much higher than normal operating temperature that it is unlikely that breakdown would ever occur. Nevertheless, to guard against this possibility, ventilation systems have been installed which operate, when activated, to remove vapor from inside the coolant reservoir and exhaust it in a safe location outside the building away from personnel. Fresh air is drawn into the coolant reservoir to replace the vapor thus removed. The toxic gases, though toxic in high concentrations in a confined area, do not present a hazard when exhausted through a suitably located outdoor exhaust pipe, which reduces the concentration of the gas to levels which are not harmful. The system was designed to be activated by a computer operator upon observation of excessive bubbling within the computer container. For greater reliability, it was proposed to make the activation of the ventilation system automatic, but detection of bubbles in the cooling system is not a reliable method for activating the exhaust system since a certain amount of bubbles are normally formed in the cooling process. Direct detection of the gases produced by breakdown of the fluorocarbon through physical or chemical means is not practical.

In accordance with this invention, it is proposed to indirectly sense for breakdown of the fluorocarbon coolant by precise monitoring of the power supply voltages to the computer. This is based upon the reasoning that temperatures high enough to cause breakdown can only be produced in two ways within the computer tank. One is through partial or total failure of the circulation system, which will produce a relatively rapid rise in temperature in the coolant within the tank, or in the coolant within one or more stacks of the computer associated with an impaired or failed coolant supply. Such temperature rise, although very rapid, can be detected by the above-mentioned coolant temperature and flow, and cooling system component monitoring, and automatic controls can shut down the computer before excessive temperatures are reached so the breakdown would be avoided.

The other way in which coolant breakdown could occur is a local "hot spot" within the container which would not be immediately detected by the above-mentioned monitoring system. Such a "hot spot" would have to be caused by electric arcing due to a catastrophic electronic failure or short circuit, such as foreign matter or a loose part lodging between conductors carrying power and ground potentials. A fault of this type could produce arcing that would result in high temperature at the immediate vicinity of the arc, which could produce coolant breakdown. The toxic gas would then rise as bubbles to the top of the container and would probably be drawn off to the reservoir through normal reservoir circulation. Any such short circuiting or arcing would result in a detectable variance in voltage on the bus or buses in question.

SUMMARY OF THE INVENTION

Accordingly, the present invention provides an automatic safelty monitoring system for a liquid immersion and circulation system for cooling high-powered electronic apparatus such as a computer immersed therein. The monitoring system uses monitoring circuits and power supplies totally independent of the circuitry and power supplies for the computer that is cooled by the immersion system. The monitoring system has voltage taps connected to each and every power supply bus in the computer, and these taps are monitored for predetermined voltage tolerance limits, either continuously or by a rapid scanning technique. Preferably, the monitoring circuit is outside the computer tank and the tap leads are brought outside the tank to it. This eliminates the possibility that the monitoring circuitry itself might be impaired by a fault occurring inside the tank which happened to be in the immediate vicinity of the monitoring circuit. When a condition of one or more supply voltages being outside the predetermined limits is encountered, automatic controls shut down the power supply to the computer and activate the ventilation blowers and air valves to remove any coolant breakdown gas products from the reservoir to the outside.

DETAILED DESCRIPTION OF THE PREFERRED EMBODIMENT

Figure 1:
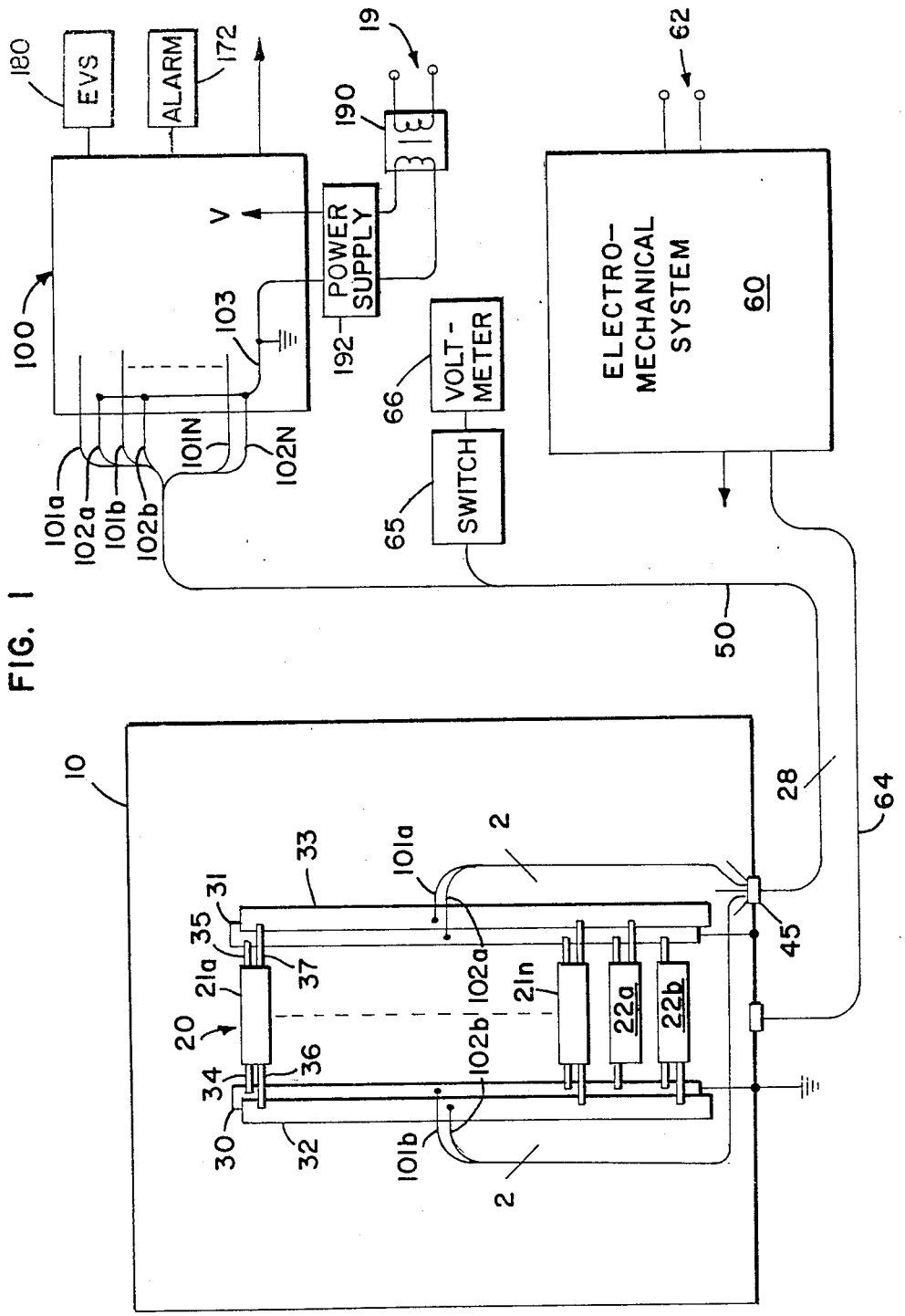
FIG. 1 is a schematic representation of an immersion-cooled computer illustrating the connection thereof to the monitoring system according to the present invention.
Figure 3:
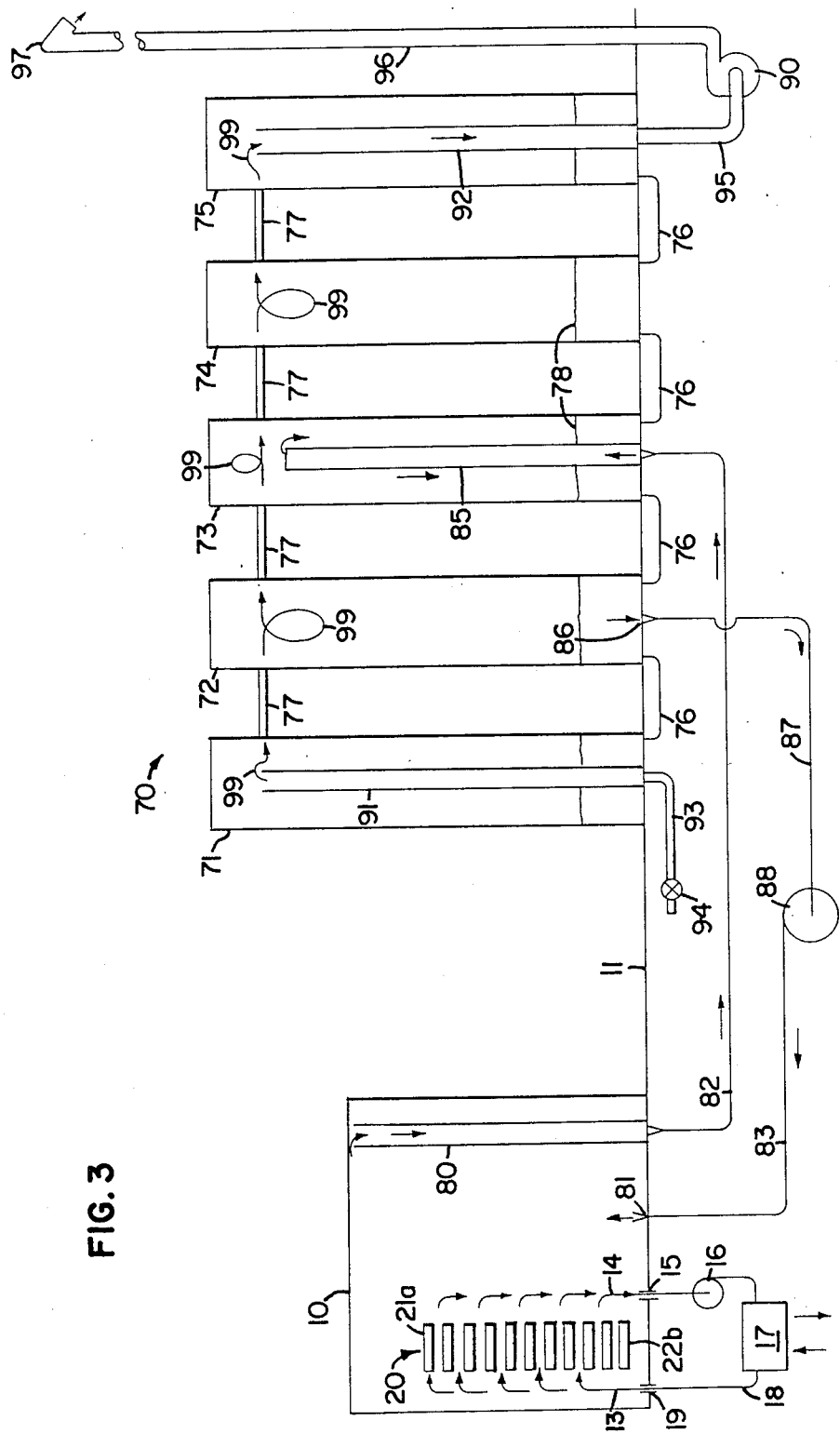
FIG. 3 is a schematic representation of the immersion cooling system for the computer of FIG. 1, including the coolant reservoir and illustrating coolant circulation and the reservoir ventilation system.

FIG. 1 shows in generalized schematic form a portion of an immersion-cooled computer including the monitoring system of the present invention. Reference number 10 generally designates the tank or container which holds the circuitry of the computer. Container 10 is fully enclosed and sealed and in normal operation is filled with liquid coolant. The coolant circulation paths and apparatus are not shown in this simplified figure, but may take the form as shown in the above-mentioned U.S. Pat. No. 4,590,538. The flow patterns and circulation system are generally shown in FIG. 3, described below.

For purposes of clarity of illustration of the present invention, only a single column or stack 20 is shown for the computer. However, it will be appreciated that in practice a computer consists of several of such module stacks or columns which are arranged in a side-by-side pattern, with adjacent columns angled with respect to each other to form overall a radial array of stacks about a central zone of the computer, as disclosed in the above-mentioned U.S. Pat. No. 4,590,538. One model of computer uses fourteen columns, but the exact number is not critical to the invention.

Stack 20 includes a plurality of circuit modules 21a–21n, which are positioned in a vertical stack by a frame assembly which has been omitted from the drawing for purposes of clarity of illustration. Modules 21a–21n comprise logic circuitry, memory circuits, or both, in accordance with the design of the computer. Particular modules may consist of multiple circuit board layers holding integrated circuits and interconnected generally in accordance with the above-mentioned U.S. Pat. No. 4,590,538. At lower levels in the stack, power modules 22a and 22b are provided. It will be appreciated that although two such modules are shown, in practice a greater number might be provided.

An arrangement of vertically oriented power bus bars are positioned on either side of each stack, generally in the space between adjacent stacks. For stack 20, this includes ground bars 30 and 31. These bars are connected to the ground potential of the container 10, through straps or through connection to the metallic framework of the computer (not shown).

Positioned in front of ground bar 30, but electrically insulated therefrom, is a power bar 32. On the other side of stack 20 a power bar 33 is positioned. The computer to which the present invention is applied uses emitter-coupled logic, and therefore modules 21a–21n are supplied with −2 V and −5 V power. Power bar 32 carries −2 V power, and bar 33 carries −5 V.

The circuit modules 21a–21n, and the power modules 22a, 22b are connected to the power bars by means of clips or tabs which are attached to the appropriate ground or power planes in the module, and which reach over to the appropriate power bar and are secured thereto, preferably by small screws. For example, in FIG. 1, circuit module 21a is connected to ground bars 30 and 31 by tabs 34 and 35, respectively. Module 21a connects to power bar 32 via tab 36, and to power bar 33 via tab 37. The other modules are similarly connected to the power bars by tabs. As an alternative to tabs 34–37, a power wire and pin arrangement can be used, as shown in the above-mentioned Cray patent.

Power is applied to the power bars by the plurality of power supply modules, represented by modules 22a and 22b. These power supply modules receive 400-cycle AC current through cables (not shown) brought into container 10 from external motor-generator power apparatus. The power modules 22a, 22b contain rectifiers and related components for supplying the required DC voltage. As shown, power module 22a provides −5 VDC, and is shown connected to the ground bars 30, 31 and the −5 V bar 33. Power module 22b provides −2 VDC power and is connected to power bar 32 as well as ground bars 30, 31.

When it is necessary to service modules with the computer shut down, the coolant is removed to reservoir 70 (FIG. 3), and container 10 is partially disassembled to gain access to a column. The screws holding tabs 34–37 can be removed, and a module withdrawn. Logic connections to other modules are made by suitable connectors on the backsides of the modules not apparent in FIG. 1, in the same manner as set forth in the above-mentioned Cray patent.

As previously mentioned, the monitoring system of the present invention monitors the voltage on the power supply bars, and for this purpose sensing leads are attached to the bars at approximately their midpoints. Lead wire 101a is attached to power bar 33 and lead wire 102a is attached to its adjacent ground bar 31. These two leads then run as a twisted pair through a sealed fitting 45 in container 10, then proceed as part of a cable 50 with twisted pairs from all the other power supply bars for all the other stacks in the computer.

On the other side of stack 20, lead wire 101b is joined as a twisted pair with lead wire 102b and they also pass through fitting 45 to become part of cable 50. Logic and data connections between stack 20 and the other stacks, and between the computer and peripheral devices outside container 10, are also provided, but are not indicated in FIG. 1 because they do not directly relate to the monitoring system of the present invention.

Also shown in FIG. 1 and represented in block form is electromechanical system 60. This system, which is mounted in a pod or cabinet in the computer room near container 10, includes a number of necessary systems for the computer and particularly the immersion cooling system for the computer. This includes circulation pumps for the coolant, and relays associated therewith; monitoring systems for coolant temperature and flow rates at various locations in the system; circuit breakers and fuses for power supplies; and related hardware and monitoring items. System 60 receives AC power from a power main 62. The intercommunication between system 60 and the computer for the functions outlined above is indicated by connection 64. In addition, system 60 connects to the various pumps and relays mentioned above, but not shown in FIG. 1.

The voltage sensing leads from the power bars of the computer carried in cable 50 branch to a switch 65 for connection to a voltmeter 66. These components can also be provided in the electromechanical system pod or cabinet. Switch 65 allows selecting any of the individual power bars for display by voltmeter 66. Suitable controls are provided (not shown) for adjusting the overall system power by controlling the excitation to the motor generator, or for controlling the voltage level in individual stacks by means of banks of variable transformers to permit fine-tuning of the operating voltages to the desired level.

Cable 50 also connects to the voltage monitoring system 100, where the individual wire pairs 101, 102 for the power and ground for each power supply bar are shown entering circuit 100. The voltage sense lines 101a–101N connect to the circuitry illustrated in FIG. 2. Their paired ground leads 102a–102N are all connected together by a ground lead 103 which is the ground for monitor 100, and which is also the ground for the computer. The number of individual leads 101a–101N will depend on the number of stacks in the computer. In the example given, with fourteen stacks there would be fourteen −2 V bars and fourteen −5 V bars, so there would be twenty-eight twisted pairs in cable 50, and twenty-eight voltage leads 101a–101N connected as inputs to monitor 100.

Figure 2:
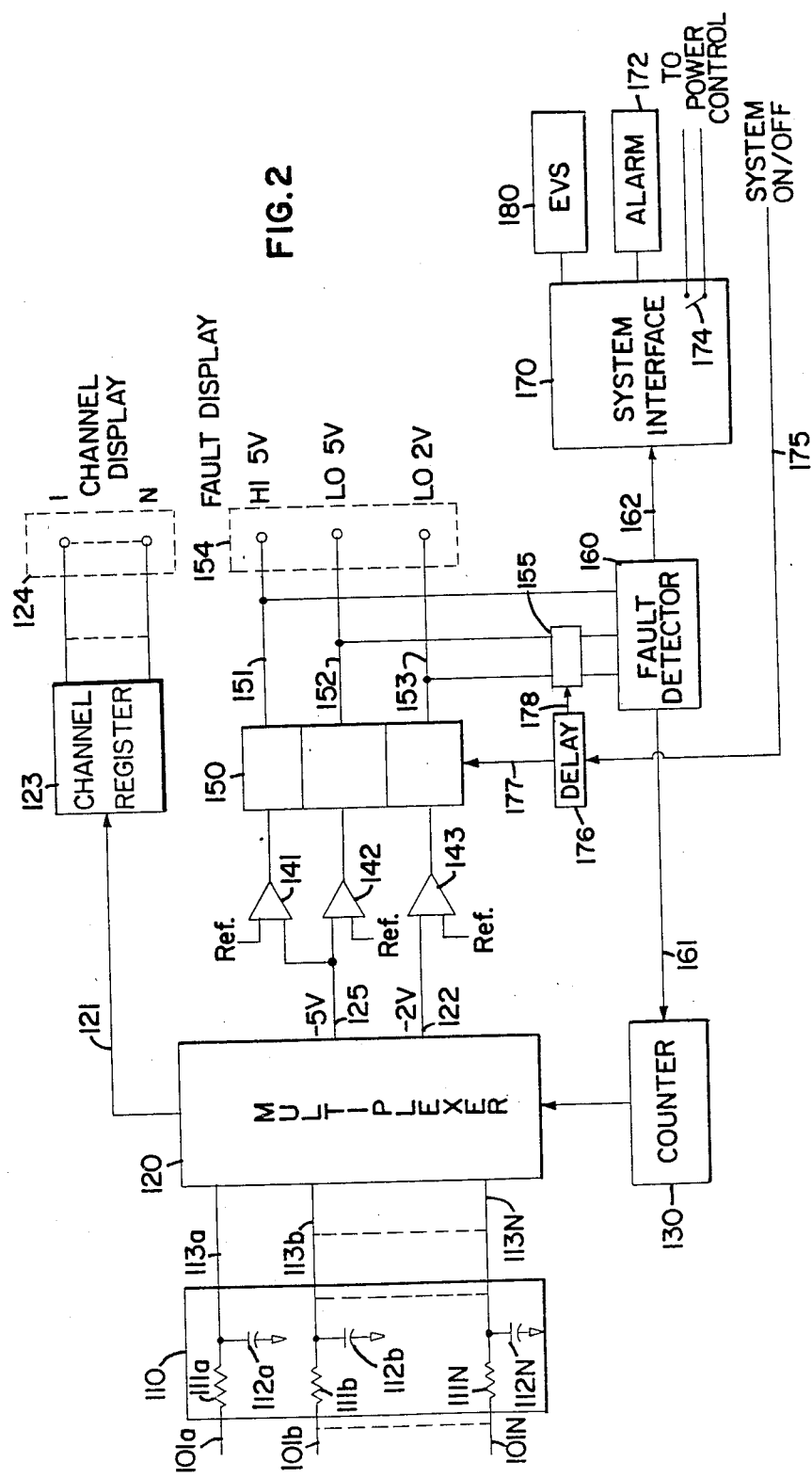
FIG. 2 is an electrical block diagram of the monitoring system of FIG. 1.

Referring now to FIG. 2, the monitoring circuit 100 is shown in greater detail. Reference number 110 is a filter for the incoming voltage sensing leads. It consists of a separate RC filter for each input lead. For example, input lead 101a connects through resistor 111a to an output lead 113a. A shunt capacitor 112a connects to signal ground. A similar filter is provided for each input lead. These filter circuits provide a low-pass filter to remove a certain amount of extraneous high-frequency noise that may be present thereon. Some noise might be picked up from the leads during their travel from a power bar in the computer to monitor 100 and some noise may be present at the power bars themselves, due to sudden current surges as large banks of memory switch on and off. Said surges and other high-frequency noise components are not relevant to the monitoring function to be performed by this circuit, and are therefore filtered out. In practice it has been found that an RC time constant of 0.1 millisecond is satisfactory, although the exact value is not critical. Resistors 111 which are connected in series in the signal paths also provide short protection for the input circuitry.

Leads 113a–113N are applied to multiplexer 120. This multiplexer is designed to switch through a number of channels equal to the number of module stacks in the computer, and to provide a pair of outputs at a time, on leads 122 and 125. Because there is a −2 V power bar and a −5 V power bar for each stack or column in the computer, such leads for a given column are paired at the input to multiplexer 120. For example, leads 113a and 113b connect from the −2 V and −5 V power supplies respectively of stack 20 in the computer; leads 113c and 113d would be from the next stack, and so on, for however many stacks there are in the computer. The paired inputs from each stack comprise a channel, so multiplexer 120 switches through a number of channels according to the number of module stacks in the computer, and in each case selects a pair and provides them at output 122 and 125. At the same time, a signal is coupled on lead 121 to a channel register 123, which in turn activates the appropriate indicator light for the current selected channel in channel display 124.

Monitoring system 100 can be designed for monitoring all N-channels. Alternatively, the channels can be grouped into banks and separate monitoring systems 100 can be provided for each bank. In the preferred embodiment, monitoring circuit boards are provided which are capable of handling eight channels, and two such boards are used, one handling eight channels and one handling six with two unused channels.

The outputs of multiplexer 120 are applied to comparators. Specifically, the output on lead 125 is applied as an input to comparators 141 an 142, and the output on lead 122 is applied to comparator 143. Comparator 141 is provided with a reference voltage which is a predetermined tolerance level more negative than the expected −5 V to be monitored on lead 125, so that comparator 141 will test for excessive voltage on a −5 V bus (high 5 V condition). Comparator 142 is provided with a reference voltage which is a predetermined tolerance less negative than the expected −5 V, so that comparator 142 will serve as a test for a voltage less negative than −5 V (low 5 V condition). Comparator 143 is supplied with a reference which is a predetermined tolerance level less negative than −2 V, so that comparator 143 serves as a test for a voltage less negative than −2 V (low 2 V condition). The outputs of these comparators connect to a fault register 150, which actually comprises three separate registers. The outputs of these registers connect via leads 151, 152 and 153, to a fault display where indicator lights are provided for high 5 V, low 5 V, low 2 V conditions. These leads also connect to a fault detector 160. Specifically, lead 151 connects directly to detector 160, and leads 152 and 153 connect through gate 155 to detector 160. In normal operation gate 155 passes signals on leads 152 and 153 to detector 160. Detector 160 connects via control line 161 to counter 130 and via control lead 162 to system interface 170.

In normal operation, counter 130 free runs, causing multiplexer 120 to constantly step through the input channels, momentarily applying the sensed voltages from the −2 V and −5 V power bars for columns to the comparator circuits. At the same time, display 124 indicates the channel thus connected. If the voltages are within tolerances, logical zeros are at the outputs of the comparators so none of the registers 150 will be set. If a fault occurs, when the multiplexer arrives at the faulty channel and its voltages are applied to the comparators, one or more of the comparators will switch their output level, thus setting one or more of the registers in register 150. When this occurs, fault detector 160, which essentially functions as an OR logic gate, sends a signal over control line 161 to inhibit counter 130, thus locking the monitoring system on the channel where the fault occurred.

The power to the computer will be quickly removed, either through the operation of this monitoring system via system interface 170, discussed below, or possibly through activation through a circuit breaker or fuse associated with a power supply for the bar in question. With the power shut down it might be difficult for service personnel to determine which channel and power supply caused the fault. However, because the monitor of the present invention stops the multiplexer at the faulty channel when the fault registers latch, the channel display 124 and the fault display 154 will show where the fault occurred.

When a fault occurs, system interface 170 activates the external vent system (EVS) 180, discussed below, activates an alarm 172 in the computer room, and activates a relay which connects to the power control for the motor generator. Specifically, the system interface controls relay contacts 174 which are connected to an apparatus (not shown) which removes the exciter field from the motor generator, thus terminating the 400-cycle AC supplies to the power supplies in the computer.

When the computer system power supply is normally turned on, a signal is provided to the monitoring system via control line 175, and is momentarily applied through delay circuit 176 and lead 177 to reset register 150, since they may have latched because of previous conditions. An inhibit signal is then applied to gate 155 by lead 178 and is maintained for a few seconds' time delay as determined by delay 176, to inhibit the low 2 V and low 5 V monitor functions of the system of FIG. 2 during power up conditions, so that they will not respond until the power supply output voltages have risen to the normal operating values. The high −5 V comparator and register do not use the inhibit, so an overvoltage condition can shut down the system at any time. Such a case might be caused by a defect in the motorgenerator controls. This is an additional safety feature of the monitor system 100.

Monitor system 100 should have its own power supply and should be isolated as much as possible from both the computer and the components and equipment in electromechanical system 60. The pump motors, relays and the like in system 60 can create a considerable amount of electrical noise which could disturb or trigger monitoring system 100 if proper isolation techniques are not employed. It is convenient to physically mount monitoring system 100 in the pod or cabinet which houses system 60, but it must be electrically isolated therefrom. The circuits in system 100 are not grounded in any way to system 60, but the entire circuit board or boards making up the system are electrically insulated from the cabinet. The ground for monitoring system 100 is tied back through the cables to the computer. A separate power supply 192 is provided and is connected for supplying operating voltage V with respect to signal ground at lead 103 for the circuits within monitor 100. Power supply 192 receives AC power from an isolation transformer 190 connected to a power main 191. Having the power supply 192 for monitoring system 100 independent of the computer is important to ensure its successful operation during a fault which may require the computer to be turned off.

In order to illustrate the function of the monitor system of FIG. 2, the overall circulation and operation of the immersion cooling system and the external vent system will first be described with reference to FIG. 3. The cooling system generally includes the tank or container 10 which houses the computer, the reservoir system 70, and associated pumps, coolant lines and heat exchangers. In FIG. 3, only a single stack 20 of circuit modules is indicated, but the actual computer would have a number of such stacks as previously described. In FIG. 3, module stack 20 is indicated in symbolic form only as a stack of modules 21a–22b, and all other components including the frame for supporting the modules and the power supply bars have been omitted for purposes of clarity. Coolant circulation means are provided in container 10 for establishing a vertical coolant supply column on one side of stack 20 and a vertical coolant removal column on the other side. The coolant supply column is indicated by flow arrows 13, and the coolant removal column is indicated by flow arrows 14. Coolant supply column 13 may serve module stack 20 and an adjacent module stack (not shown). Similarly, coolant removal column 14 may serve module stack 20 and an adjacent module stack (not shown). Coolant from coolant removal column 14 is conveyed through a suitable fitting 15 in the bottom of tank 10, to a pump 16, whose output connects through a heat exchanger 17. Heat exchanger 17 is connected to a source for cold water circulation which acts as the exchange medium. From heat exchanger 17, the coolant is conducted through conduit 18 and through a fitting 19 into coolant supply column 13. The effect is to establish a coolant circulation pattern with fresh coolant being forced up column 13, horizontally across and between the circuit modules to remove the heat therefrom, then down column 14 to the heat exchanger. In practice, a number of pumps 16 and heat exchangers 17 are used to establish the above-described coolant circulation for all of the module stacks or columns in the computer.

The reservoir comprises a plurality of containers which are typically mounted in the computer room close to tank 10, and whose primary function is to receive the coolant when tank 10 is pumped down to permit servicing the computer. Reservoir 70 comprises cylindrical containers 71–75, which in the preferred embodiment are cylinders made of a transparent plastic material. Manifolds 76 interconnect all of the cylindrical reservoirs 71–75 at or below floor level 11 so that coolant in the cylinders can flow freely from one to another and will therefore seek a uniform level 78 in all the cylinders. Because of this interconnection, all the cylinders act as one large reservoir.

A plurality of vent conduits 77 also interconnect cylinders 71–75 at or near their upper ends. These conduits are above the level that liquid coolant will reach at its maximum height in the reservoir, and these conduits serve to provide a means for gas flow and intercommunication between the cylindrical reservoirs. These cylindrical reservoirs are capped at their tops and are thus sealed from the atmosphere in the room.

The reservoir system operates in conjunction with a standpipe 80 inside computer tank 10, and a coolant inlet 81 at the floor thereof. Standpipe 80 has an open top positioned very close to the sealed cover or top of tank 10. The base of standpipe 80 connects through a fluid conduit 82 to a standpipe 85 positioned in one of the cylindrical reservoirs, for example reservoir 73. Another of the reservoirs, for example reservoir 72, has a drain 86 in its base which connects through conduit 87 to a reversible pump 88. Pump 88 connects through conduit 83 to inlet 81.

During normal operation of the computer, pump 88 establishes a circulation between the reservoir and the computer tank which is independent of and in addition to the circulation through the module stacks and heat exhangers 17 by pumps 16. Pump 88 establishes a flow of coolant from cylinder 72 through conduits 87 and 83 to inlet 81. This causes fluid to flow over the top of standpipe 80 and through conduit 82 to standpipe 85. This flow causes entrainment of small vapor bubbles which are sucked down with the flow towards the reservoir.

The coolant flows over the top of standpipe 85 and down to the coolant at level 78. The vapor bubbles eventually recondense, either in the coolant flow in the conduits or in the reservoir.

During a pump-down operation for servicing the computer, pump 88 is reversed, drawing away the coolant from tank 10 and storing it in reservoir 70.

In the event of a short circuit which might cause coolant breakdown into toxic gases as described previously, the gases would go to the top of container 10 and then be drawn off standpipe 80 and would separate from the coolant as it flows over the top of standpipe 85, or otherwise separate from the coolant in the reservoir to collect in the gas space at the tops of the cylindrical reservoirs.

Standpipes 91 and 92 are provided in the first and last cylindrical reservoirs, 71 and 75. These standpipes are open at the top and their bases connect to ducts. Specifically, the base of standpipe 91 connects through a duct 93 and a solenoid valve 94 to an air intake which conveniently can be positioned below the floor in the computer room. The base of standpipe 92 connects through a duct 95 to an exhaust fan 90, which connects in turn through a duct 96 to a roof-mounted exhaust outlet 97.

The monitor system 100 interfaces the reservoir system 70 outlined above when a fault has been detected. The EVS system 180 when activated by monitor 100 opens solenoid valve 94 and activates exhaust fan 90. This draws in air which follows the path generally indicated by flow arrows 99 through the upper regions of all of the cylindrical reservoirs and out to the exhaust vent 97 on the roof. Because vent conduits 77 are relatively small compared with the dimensions of the cylindrical reservoirs, there will not be a single straight through flow path, but there will be mixing as indicated by flow arrows 99, and this helps sweep the gas from the reservoirs.

It will thus be appreciated from the foregoing description that the present invention provides a reliable and effective system for guarding an immersion cooling system against the possibility of toxic gas formation due to overheating and breakdown of the coolant because of a system failure.

What is claimed is:

1. A safety monitoring system for an immersion cooling system for a computer or other high-density electronic assembly of the type including a plurality of circuit modules and power supply buses therefor immersed in liquid coolant, and a ventilation system for removing gases from the cooling system, comprising:
    means for sensing voltages on said power supply buses;
    means for comparing the sensed voltages to predetermined reference voltages which define normal operating conditions; and
    means operatively connected to said comparison means and operative in response to a fault condition of sensed voltage being outside said normal operating conditions for causing the power to said computer to be turned off and for activating said ventilation system.

2. Apparatus according to claim 1, wherein said monitoring system is positioned remote from said computer externally of said immersion cooling system, and wherein said means for sensing voltage includes voltage taps on said power supply buses, and includes lead wires connected to said voltage taps and extending out of said immersion cooling system to said monitoring system.

3. Apparatus according to claim 2, further including a power supply for said monitoring system which is separated from, and independent from, power supplies for said computer.

4. Apparatus according to claim 1, wherein said monitor includes means for sequentially scanning the voltages on said power supply buses, means for indicating the bus being scanned, and means for stopping said scanning means in the event of occurrence of a fault so that said indicating means will indicate the identification of the bus associated with the fault.

5. A safety monitoring system for an immersion cooling system for a high-density electronic assembly of the type including a plurality of circuit modules and power supply buses therefor immersed in liquid coolant, and a ventilation system for removing gases from the cooling system, comprising:
    sense means for measuring voltages on said power supply buses;
    comparator means connected to said sense means for comparing measured voltages received from said sense means to preselected reference voltages which define normal operating conditions and for producing overvoltage and undervoltage signals in response to said measured voltages being outside said normal operating conditions; and
    fault detect means operatively connected to said comparator means and responsive to said overvoltage and undervoltage signals for causing the power of said high-density electronic assembly to be turned off and for activating said ventilation system.

6. Appartus according to claim 5 further including means for inhibiting said monitoring system from turning off the power due to undervoltage conditions during power-up until the voltages on said power supply buses have reached the normal operating conditions but wherein said monitoring system remains operative during power-up to protect against overvoltage conditions.

7. A safety monitoring system for an immersion cooling system for a computer or other high-density electronic assembly of the type including a plurality of circuit modules and power supply buses therefor immersed in liquid coolant and a ventilation system operative when activated to remove gases from the immersion cooling system to a safe location away from personnel, comprising:
    means for sensing voltages on said power supply buses;
    means for comparing the sensed voltages to a predetermined normal operating voltage range; and
    means operatively connected to said comparison means and to said ventilation system and operative in response to a fault condition of a sensed voltage being outside said normal operating range for activating said ventilation system, whereby any gases which may be generated within the immersion cooling system will be exhausted to a safe location.

8. A monitoring system according to claim 7 wherein said monitoring system is positioned remote from said computer externally of said immersion cooling system, wherein said monitoring system includes a power supply which is separate from and independent from power supplies for said computer, and wherein said means for sensing voltages includes voltage taps on said power supply buses of said computer and lead wires connected to said voltage taps and extending out of said immersion cooling system to said monitoring system.

9. A monitoring system according to claim 7 including means operative in the event of detection of a fault condition for indicating the identity of the power supply bus associated with the fault condition.

* * * * *